Patented Dec. 4, 1951

2,576,921

UNITED STATES PATENT OFFICE 2,576,921

PROCESS FOR PRODUCING AN INK-RECEPTIVE SURFACE ON TRACING CLOTH

John H. Buscher, Washington, D. C., assignor to the United States of America as represented by the Secretary of the Interior No Drawing. Application November 24, 1948, Serial No. 61,901

1 Claim. (Cl. 117—164)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to improved tracing cloths such as are used by draftsmen in making drawings for blueprinting and the like. More particularly, this invention relates to a novel sizing composition for imparting improved ink receptivity to tracing cloths or the like.

Heretofore, tracing cloths for drafting use have been known which comprises linen or other textile material saturated with gelatinized starch and then smoothed by doctoring, calendering, and the like, but such cloths suffer from the disadvantage that the surfaces thereof take up moisture readily, and in consequence, dimensional changes of a relatively high magnitude occur when such cloths are exposed to high atmospheric humidities. In order to overcome the objections to such cloths, there have more recently been introduced so-called "waterproof" tracing cloths which are relatively insensitive to humidity changes but which, unfortunately, have a surface which is not readily wetted by ink or which are highly abrasive to drafting instruments. This invention overcomes the disadvantages of both types of drafting or tracing cloths inasmuch as it provides moisture-proof qualities in the starch type of tracing cloth while at the same time providing a good ink receptivity or "tooth" to the moisture-proof type of tracing cloths.

This invention, accordingly, has for an object the provision of an improved tracing cloth which has good ink receptivity and at the same time remains dimensionally stable under humidity changes. Another object is to provide a sizing solution or mixture for coating or other application to tracing cloths. Other objects will be apparent or will appear hereinafter as the ensuing description proceeds.

These objects are accomplished in accordance with this invention wherein tracing cloth is provided with an ink-receptive surface by treating the surface thereof with a mixture of starch, gelatin, alum, alcohol and formaldehyde.

While the invention is not to be limited to any particular theory or explanation, it appears that the gelatin tenaciously adheres to the tracing cloth and is hardened in situ by the alum and the formaldehyde. The starch tempers the hardened gelatin coating so as to render the same non-abrasive while providing for ready retention of the ink later to be applied. The starch may be in part hardened by the alum and in part by the formaldehyde. The alcohol of the sizing composition provides for ready spreading and wetting and accelerates the hardening action of the alum and formaldehyde on the starch and gelatin.

Various types of starches are suitable for employment in accordance with this invention, such as, for example, corn starch, potato starch, wheat starch, and, preferably, arrowroot starch. It has been found that arrowroot starch is simple to handle and provides a sized tracing cloth which is of superior quality. In general, only about two grams of arrowroot or other starch is required for each quart of sizing mixture.

Various types of gelatin may be employed in accordance with this invention, such as, for example, isinglass, glue, and, preferably, ordinary gelatin which meets the standards of the United States Pharmacopoeia. In general, about one ounce of gelatin is required per quart of sizing mixture although greater or lesser amounts may be employed.

As the alum component of the sizing mixture there may be employed any of the usual alums capable of hardening gelatin, such as, for example, potash alum, ammonium alum, chrome alum, and, preferably, aluminum sulphate. Only about one-fourth ounce by weight of alum is required for each quart of sizing mixture. Any of the lower aliphatic water-soluble alcohols may be employed, such as, for example, ethyl, methyl or isopropyl alcohols, but it is preferred to employ ethyl alcohol for reasons of economy and convenience. The alcohol is employed in the amount of about one ounce liquid per quart of sizing mixture. The sizing mixture also includes formaldehyde to combine wth and set the starch and gelatin. In general, about one ounce liquid of formalin (commercial 37% formaldehyde solution) is added although greater or lesser amounts may be employed.

In preparing the sizing mixture, it has been found to be desirable to mix the starch, gelatin and alum separately in small quantities of water and then combine the same with one-half of the total quantity of water to be used. Thereafter, the alcohol and formaldehyde are combined with the remaining one-half of the total quantity of water and the two halves of the mixture are then combined to make the finished sizing solution.

It has been found desirable forthwith to coat or otherwise treat the tracing cloth with the sizing mixture. This may be accomplished by painting, brushing, spraying or dipping the tracing cloth so as to bring the sizing mixture into intimate contact with at least one side of the tracing cloth. After such treatment, the excess sizing mixture is removed in any desired manner and the thus-treated tracing cloth is allowed to dry.

The following examples illustrate how the invention may be carried out, but it is not limited thereto:

Example I

Two grams of arrowroot starch are mixed with about one ounce of water and separately one ounce of gelatin is mixed with about an equal amount of water. Similarly, one-fourth ounce of ordinary alum is dissolved in about one ounce of water. The three components are then mixed with sufficient water to make sixteen fluid ounces. This is designated as solution "A." Solution "B" is then prepared by mixing one ounce of 95% ethyl alcohol with one ounce 37% formalin and diluted with sufficient water to make sixteen ounces. Solution "A" is then mixed with solution "B" and waterproof tracing cloth (for example, "Draftex" sold by the Dietzgen Company of Chicago, Illinois) is coated with the solution. The treated tracing cloth is then hung up to dry by one edge, the excess dripping off by gravity. Upon drying, it is found that an excellent ink-receptive, moisture resistant surface has been provided while retaining the dimensionally stable qualities of the original tracing cloth.

Example II

Ordinary starch sized tracing cloth is treated with the sizing mixture of Example I in a similar manner. After drying it is found that an excellent ink-receptive surface has been provided, while, at the same time, the tracing cloth is practically insensitive to humidity changes in the atmosphere.

While, in the foregoing description, the invention has been particularly described with reference to the treatment of tracing cloths, it is also applicable to the treatment of other materials employed for making drawings, such as, for example, Bristol board, tracing vellum, and the like, to improve the surface for inking. The sized tracing cloths or the like made in accordance with this invention are non-abrasive to drafting instruments while at the same time providing an excellent surface for inking. The ink flows smoothly, adheres well, and does not run. Repeated erasures can be made without harming the surface.

Various changes can be made in this invention as described without departing from the spirit or scope thereof.

What is claimed is:

A process for producing an ink-receptive but non-abrasive surface on tracing cloth, which comprises treating such material with a mixture of about two grams arrowroot starch, one ounce gelatin by weight, one-fourth ounce alum by weight, one ounce alcohol by volume, one ounce formaldehyde by volume as 37% formalin and water to make one quart, and drying the thus-treated tracing cloth.

JOHN H. BUSCHER.

REFERENCES CITED

The following references are of record in the file of this patent:

UNITED STATES PATENTS

| Number | Name | Date |
| --- | --- | --- |
| 1,537,960 | Oliver | May 19, 1925 |
| 1,582,605 | Haskins | Apr. 27, 1926 |
| 1,597,435 | Davis | Aug. 24, 1926 |
| 1,725,699 | Boyce | Aug. 20, 1929 |
| 2,247,349 | Champion | July 1, 1941 |
| 2,334,098 | Hubbard | Nov. 9, 1943 |

FOREIGN PATENTS

| Number | Country | Date |
| --- | --- | --- |
| 184,173 | Great Britain | June 28, 1923 |
| 425,215 | Great Britain | Mar. 6, 1935 |